US011154129B2

(12) United States Patent
Harlee

(10) Patent No.: US 11,154,129 B2
(45) Date of Patent: Oct. 26, 2021

(54) WHEELCHAIR JOYSTICK RETRIEVER

(71) Applicant: CREATIVE TOUCH SOLUTIONS LLC, Baltimore, MD (US)

(72) Inventor: Phoenix Harlee, Baltimore, MD (US)

(73) Assignee: CREATIVE TOUCH SOLUTIONS LLC, Baltimore, MD (US)

( * ) Notice: Subject to any disclaimer, the term of this patent is extended or adjusted under 35 U.S.C. 154(b) by 178 days.

(21) Appl. No.: 15/939,430

(22) Filed: Mar. 29, 2018

(65) Prior Publication Data

US 2018/0279747 A1  Oct. 4, 2018

Related U.S. Application Data

(60) Provisional application No. 62/479,468, filed on Mar. 31, 2017.

(51) Int. Cl.
*A45F 5/00* (2006.01)
*B25J 1/04* (2006.01)

(52) U.S. Cl.
CPC ............ *A45F 5/004* (2013.01); *B25J 1/04* (2013.01); *A45F 2005/006* (2013.01); *A45F 2005/008* (2013.01); *A45F 2200/05* (2013.01)

(58) Field of Classification Search
CPC ........ A45F 5/004; A45F 2005/006; B25J 1/04
USPC ............................ 294/219, 24, 209, 210, 211
See application file for complete search history.

(56) References Cited

U.S. PATENT DOCUMENTS

| 2,947,456 | A | * | 8/1960 | Seron | A45F 5/00 224/258 |
|---|---|---|---|---|---|
| D386,610 | S | * | 11/1997 | Wright | D3/207 |
| D392,583 | S | * | 3/1998 | Hoffman | D11/7 |
| 5,784,760 | A | * | 7/1998 | Leitzke | F16G 11/10 24/17 B |
| 5,938,137 | A | * | 8/1999 | Poulson | A45F 5/004 242/379.2 |
| D418,774 | S | * | 1/2000 | Kalbach | D11/26 |
| 6,216,319 | B1 | * | 4/2001 | Elkins | A45F 5/00 224/221 |
| D520,738 | S | * | 5/2006 | Tarantino | D3/218 |
| D539,697 | S | * | 4/2007 | Mackay | D11/200 |
| D545,660 | S | * | 7/2007 | Robinson | D8/107 |
| D550,951 | S | * | 9/2007 | Belsky | D3/10 |
| D555,531 | S | * | 11/2007 | Wilson | D11/7 |
| 7,387,324 | B1 | * | 6/2008 | Sharpe | A45F 5/1026 16/425 |
| 8,061,751 | B2 | * | 11/2011 | Hatcher | B25G 1/04 294/115 |
| 8,226,134 | B2 | * | 7/2012 | O'Donnell | F24B 1/199 294/11 |
| D667,215 | S | * | 9/2012 | DeGrouchy | D3/215 |
| D677,189 | S | * | 3/2013 | Kalbach | D11/3 |
| 8,544,919 | B2 | * | 10/2013 | Oh | A01D 11/00 294/115 |
| D699,144 | S | * | 2/2014 | Kalbach | D11/3 |

(Continued)

*Primary Examiner* — Paul T Chin
(74) *Attorney, Agent, or Firm* — Gianna Julian-Arnold; Saul Ewing Arnstein & Lehr LLP

(57) ABSTRACT

A retractable retrieval device comprising a lanyard, a retractable element, a retractable cord and a connecting element. The retractable element comprises a first end coupled to the lanyard and a retractable cord coupled to the connecting element is coupled to the retractable cord. The connecting element of the retractable retrieval device may be coupled to a reach extender.

14 Claims, 5 Drawing Sheets

(56) References Cited

U.S. PATENT DOCUMENTS

| | | | | |
|---|---|---|---|---|
| D743,691 S * | 11/2015 | Romano | .................. | D11/201 |
| D779,815 S * | 2/2017 | Namazy | .................. | D3/218 |
| 9,889,776 B1 * | 2/2018 | Turnbo | .................. | B60N 2/28 |
| D892,494 S * | 8/2020 | Vitko | .................. | D3/218 |
| 2004/0135387 A1 * | 7/2004 | Keith | .................. | B25J 1/02 |
| | | | | 294/209 |
| 2007/0158158 A1 * | 7/2007 | Ameche | .................. | A45C 11/18 |
| | | | | 190/108 |
| 2010/0012545 A1 * | 1/2010 | Bottoms | .................. | B25H 3/003 |
| | | | | 206/493 |
| 2011/0226823 A1 * | 9/2011 | Jasa | .................. | A45F 5/004 |
| | | | | 224/162 |
| 2014/0253338 A1 * | 9/2014 | Jennings, III | .................. | G08B 21/24 |
| | | | | 340/686.6 |
| 2014/0259539 A1 * | 9/2014 | Ringgenberg | .................. | F41C 33/00 |
| | | | | 24/13 |
| 2016/0135576 A1 * | 5/2016 | Purlee | .................. | A45F 5/02 |
| | | | | 24/3.1 |

* cited by examiner

WHEELCHAIR JOYSTICK RETRIEVER

CROSS-REFERENCE TO RELATED APPLICATIONS

This application claims priority under Title 35, United States Code, Section 119(e), to U.S. Provisional Application Ser. No. 62/479,468 titled "Reach Extender Retrieval Device," filed Mar. 31, 2017, which is incorporated herein, in its entirety, by this reference.

FIELD OF THE INVENTION

The present invention relates, generally, to a retrieval device for a reach extender, and, more specifically, to a retractable retrieval device for a reach extender.

BACKGROUND OF THE INVENTION

Reach extenders are commonly used to improve users ability to interact with objects beyond the distance of their normal reach. For example, a reach extender may extend the reaching distance of a user having limited or comprised mobility, improving the ability for the user to function independently. However, issues arise when a user drops the reach extender and is unable to retrieve reach extender. This is specifically an issue for those in the wheeled mobility community. The ability to access dropped items without assistance is highly important for the wheeled mobility community. However, many of those in the wheeled mobility community resort to over extending themselves to retrieved dropped items, increasing the chances that they will fall.

Therefore, Applicant has identified the need for a retrieval device for reach extenders, such that if the reach extender is dropped, the retrieval device will at least aid in returning the reach extender to its secured location.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the present invention provides for a retractable retrieval device comprising a lanyard, retractable element and a connecting element. The retractable element comprises a first end coupled to the lanyard and a retractable cord coupled to the connecting element.

In another embodiment, an aspect of the present invention provides for a retrievable tool comprising a reach extender and retractable retrieval device coupled to the reach extender. The reach extender comprises a handle, lever pole region and at least one closing member attached to the pool region and controlled by the lever. The retractable retrieval device comprises a lanyard, retractable element and a connecting element. The retractable element comprises a first end coupled to the lanyard and a retractable cord coupled to the connecting element. The connecting element is further coupled with the reach extender.

DETAILED DESCRIPTION

Figure 1A:
FIGS. 1A-1B show a retractable retrieval device according to embodiments of the invention.

FIG. 1A illustrates retractable retrieval device 100 comprising a lanyard 110, retractable element 120, and connecting element 130. A first end of retractable element 120 is coupled with lanyard 110 and a retractable cord of the retractable element is coupled with connecting element 130.

Lanyard 110 forms an opening sized such that lanyard 110 can be secured around an object. In various embodiments, the object may be located on a wheel chair or assistance device for use by a user. For example, the object may be a joystick of a wheel chair, handle, arm rest, of a or the like. In other embodiments, the object may be a wrist, shoulder, or neck of a user. In one embodiment, lanyard 110 is adjustable such that the size of the opening can be increased or decreased. A quick release mechanism may be included with lanyard 110 such that lanyard 110 may be quickly removed from around an object. Further, lanyard 110 may comprise a corded or webbing material. However, in various embodiments other materials may be used. The width of the lanyard may be about 0.25 in., about 0.33 in., about 0.5 in., about 0.66 in., about 0.75 in. or about 1 in. Further, lanyard 110 may have a length of at least 7 in. In other embodiments, lanyard 110 may comprise other widths, and may be less than 0.25 in. or greater than 1 in. and lanyard 110 may have a length that is less than or greater than 7 in. For example, lanyard 110 may have a length of in the range of about 3 in. to about 7 in. or in the range of about 7 in. to about 14 in.

Lanyard 110 may further comprise a tightening member configured to change the size of opening in lanyard 110. In one embodiment, the tightening member tightens or loosens lanyard 110 such that it may be more securely attached and/or more easily removed from an object.

In various embodiments, lanyard 110 may comprise printed text and/or images. In one embodiment, one of a company logo and marketing message may be printed on lanyard 110. Further, the color of lanyard 110 may correspond with a color of a wheelchair or other device.

As is illustrated in FIG. 1A, lanyard 110 is coupled to connecting member 112 located proximate where the lanyard material comes together to form the opening. Connecting member 112 may comprise a metal and/or plastic material. In one embodiment, connecting member 112 may be a split ring, hinged connector, clip, screw connected metal link, plastic folded over tab, or any other device that is able facilitate connection between lanyard 110 and an another element. Connecting member 112 may comprise a circular, elliptical, triangular, or rectangular shape. In various embodiments, connecting member 112 forms a detachable connection between lanyard 110 and retractable element 120.

Retractable element 120 is connected to lanyard 110. In one embodiment, a first end of retractable element 120 comprises a connector that forms the connection between connecting member 112 and retractable element 120. In one embodiment, clip 122 is used to connect retractable element 120 to lanyard 110. In other embodiments, other connecting elements may be used. While FIG. 1 shows clip 122, in other embodiments, clip 122 may be replaced with any other connecting device that is able to couple lanyard 110 with retractable element 120. In one or more embodiments, retractable element 120 is removably connected to or permanently connected to lanyard 110 via clip 122. Retractable element 120 may comprise printed text and/or one or more images. Further, at least one of the text, images, and color of retractable may be coordinated with lanyard 110.

Figure 1B:
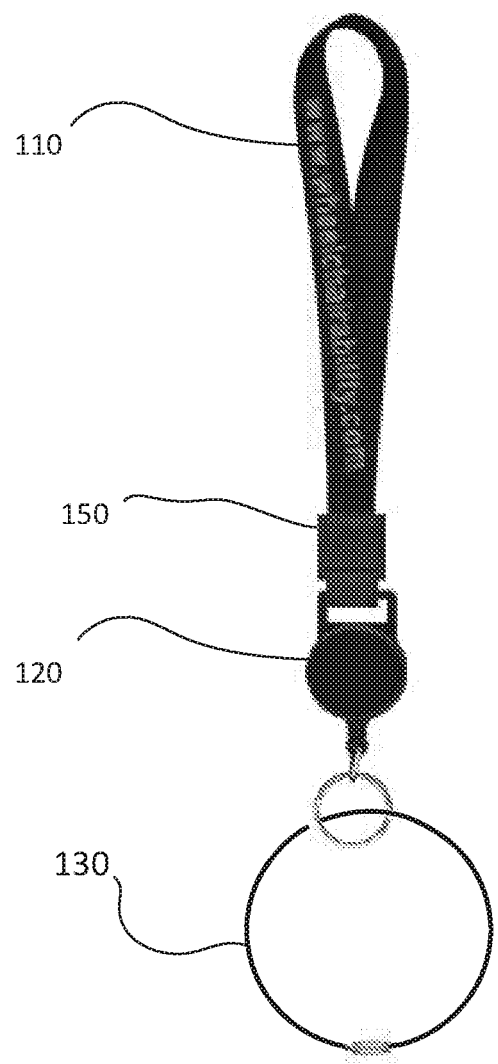

FIG. 1B illustrates another embodiment of retractable retrieval device 100, in the illustrated embodiment, lanyard 110 comprises connector 150 to retractable element 120. In contrast to the embodiment shown in FIG. 1A, the embodiment of FIG. 1B does not comprise connecting member 112. As is illustrated, no intermediary elements are used to couple lanyard 110 with retractable element 120. Connector 150 which forms one end of lanyard 110, functions as the connection point between lanyard 110 and retractable element 120. In one embodiment, connector 150 holds the ends of lanyard 110 together such that a loop may be formed. Connector 150 may comprise a rubber, plastic or metal material.

Retractable element 120 further comprises a retractable cord 124. The retractable cord may be about 29 in. in length. In other embodiments, the retractable cord comprises a length of 22 in. In yet other embodiments, the length of the retractable cord may be any length such that is sufficiently maintains a connection between lanyard 110 and reach extender 310.

Figure 1C:
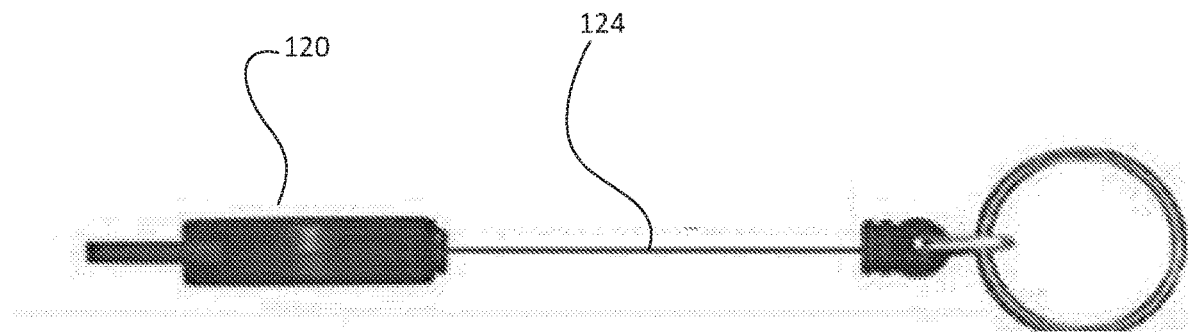
FIG. 1C shows a side view of a retractable element having an at least partially extended retractable cord according to an embodiment of the invention.

Retractable cord acts as a tether between lanyard 110 and a device with which it is connected. As is shown in FIG. 1A, the retractable cord is connected to connecting element 130. A split ring, hinged ring, clip or similar connector may be used to removably connect the retractable cord to connecting element 130. However, in one embodiment, connecting element 130 is connected directly to an end of retractable cord 124. FIG. 1C illustrates a side view of retractable element 120 with retractable cord 124 partially extended. In various embodiments, retractable cord 124 may automatically retract when extended. In other embodiments, retractable cord 124 retracts after a button or trigger is depressed.

Figure 2A:
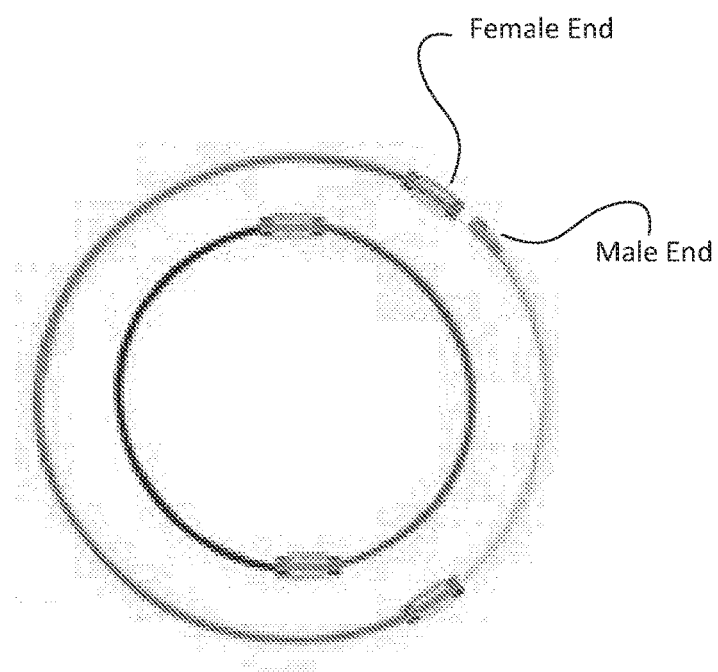
FIG. 2A shows example connecting elements according to an embodiment of the invention.
Figure 2B:
FIG. 2B shows various embodiments of a retractable connector according to an embodiment of the invention.
Figure 3:
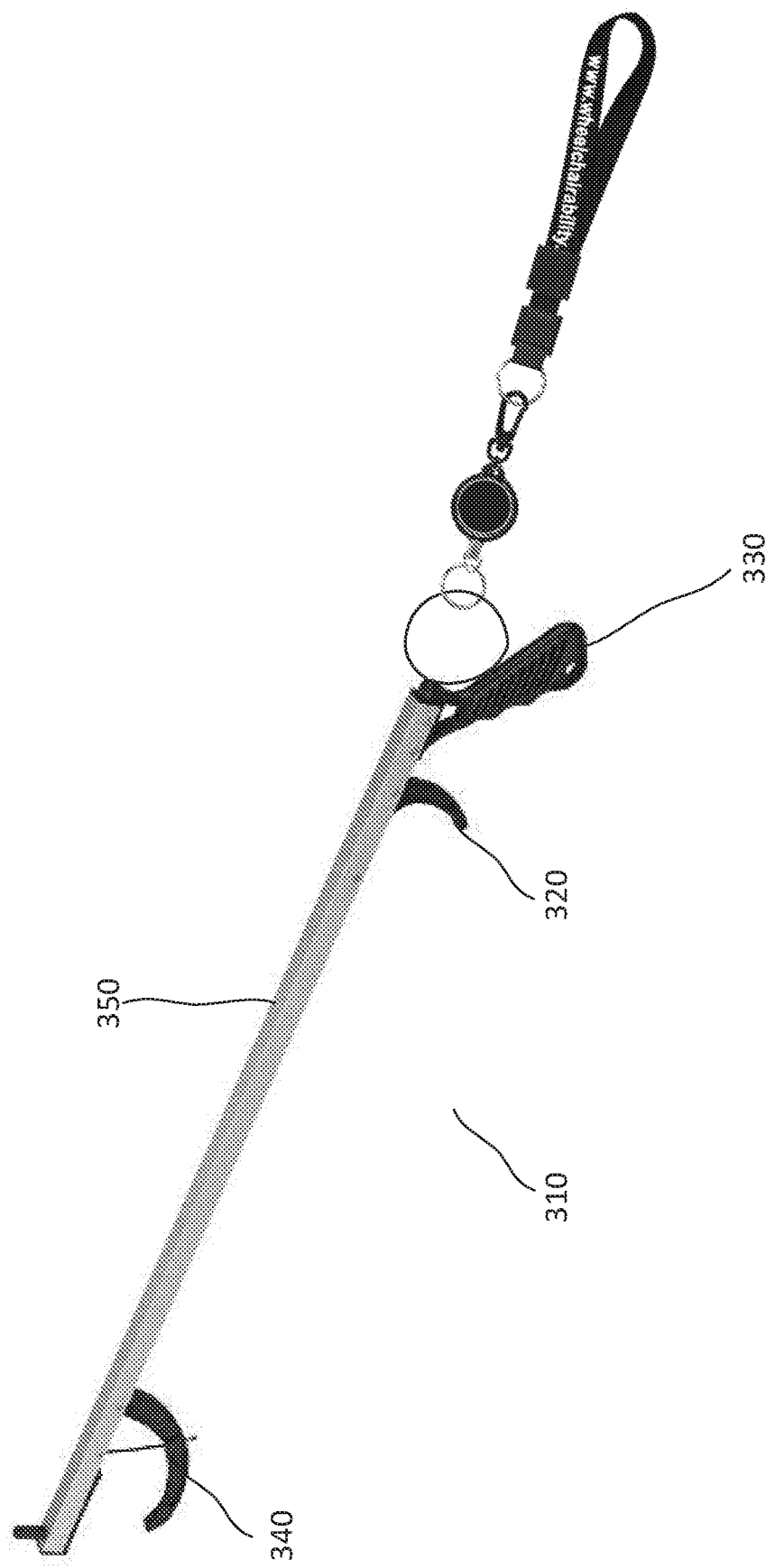
FIG. 3 illustrates a reach extender connected to a retractable retrieval device according to an embodiment of the invention.

Connecting element 130 couples retractable cord 124 with a reach extender (reach extender 310 of FIG. 3). In one embodiment, connecting element 130 has a first and second portion coupled together via a screw locking portion. As shown in FIG. 2A, the first portion comprises a male end having external threads and the second end comprises a female end having internal threads; the male end is inserted into the female and as the female end is tightened it extends over the male end, creating a secure connection. FIG. 2B illustrates various embodiments of retractable element 120 and connector element 130. As illustrated in FIG. 2B, connector element 130 may comprise at least one of a substantially flexible or non-flexible material. For example, connector element 130 may comprise a cable or wire. In one embodiment, connector element 130 is a chain having a chain connector. For example, connector element 130 may be a ball chain with a ball chain connector. In other embodiments, connector element 130 may be a chain having various links with a chain link connector. Further, connecting element 130 may be non-flexible and may comprise a metal or plastic material. In other embodiments, connecting element 130 may be a split ring connector, a clip, gate ring or an hinged ring. In one embodiment, connecting element 130 has a circumference of about 6 in. Further, connecting element 130 may be any color or combination of colors and may be coordinated with the color of lanyard 110.

Reach extender 310 has a receiving hole for receiving connecting element 130. Retractable cord 124 acts as a tether between reach extender 310 and lanyard 110. Reach extender 310 comprises lever 320, handle 330, a pole region 350 and jaw member 340 attached to pole region 350 and controlled by lever 320. As lever 320 is depressed, the jaw member 340 closes, allowing reach extender 310 to grip an object. Jaw member 340 may be open by default and closed by depressing lever 320. Reach extender 310 may be used to grab objects outside of the normal reach a of user. In many instances, a reach extender is used by user with reduced or compromised mobility for improve accessibility. Reach extender 310 illustrates a single jaw member that moves in coordination with the lever; however, in other embodiments, reach extender 310 may comprises at least a pair of jaw members that move in coordination with lever 320. Reach extender may be about 26 inches or more in length. In other embodiments, reach extender may be less than or greater than 26 inches in length.

Retractable retrieval device 100 may be used to aid in retrieval of a reach extender, such as reach extender 310. As shown in FIG. 3, connecting element 130 couples retractable element 120 to reach extender 310 through a receiving hole. The receiving hole may be located at any position on reach extender 310, however, in one particular embodiment, the receiving hole is located near the handle. As reach extender 310 is moved away from lanyard 110, retractable cord 124 extends, maintaining a point of contact between reach extender 310 and lanyard 110. In one example, lanyard 110 is looped around a joystick of a powered wheel chair and connecting element 130 is coupled to reach extender 310. In such an embodiment, retractable cord 124 provides a user with additional freedom of motion as compared to a device not having a retractable cord which keeps the reach extender 310 at a fixed distance from a lanyard. Retractable cord 124 allows the user to use the reach extender without having to remove it from a joystick or any other secure position. Additionally, retractable cord 124 may return reach extender 310 to a user when it is dropped, or otherwise removed from the secured position. In one embodiment, the strength of retractable cord 124 and retractable element 120 may be configured such the cord retracts under the weight of a reach extender. In one embodiment, retractable cord 124 is configured to extend under the weight of a reach extender, but not retract or completely retract. In such an embodiment, a user may retrieve the reach extender by manually retracting or pulling on the retractable cord.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. A retractable retrieval device comprising:
a lanyard configured and adapted to couple to a joystick of a wheelchair;
a retractable element comprising a first end coupled to the lanyard and a retractable cord, wherein the retractable cord is configured and adapted to extend under a weight of a reach extender coupled to the retractable element, and wherein the first end of the retractable element is configured to form a shape of the lanyard;
a connecting element comprising a screw locking portion and coupled to the retractable cord via a second connecting element at one end wherein the other end of the connecting element is coupled to a handle of the reach extender via a defined hole in the handle.

2. The retractable retrieval device of claim 1, wherein the connecting element is circular in shape.

3. The retractable retrieval device of claim 1, wherein the retractable cord comprises a length of one of about 22 inches and 29 inches.

4. The retractable retrieval device of claim 1, wherein connecting element comprises a circumference of about 6 inches.

5. The retractable retrieval device of claim 1, wherein the first end of the lanyard comprises a metal connector.

6. The retractable retrieval device of claim 5, wherein the metal connector is a split ring connector.

7. The retractable retrieval device of claim 5, wherein the first end of the retractable connecting element comprises a clip, wherein the clip is coupled to the metal connector.

8. A mechanical tool comprising:
a reach extender comprising a handle, a lever, pole region and at least one closing member attached to the pole region and controlled by the lever, wherein the reach extender defines a hole on the handle; and
a retractable retrieval device coupled to the reach extender, the retractable retrieval device comprising:
a lanyard configured and adapted to couple to a joystick of a wheelchair;
a retractable connecting element comprising a first end coupled to the lanyard and a retractable cord, wherein the retractable cord is configured and adapted to extend under a weight of the reach extender, and wherein the first end of the retractable element is configured to form a shape of the lanyard;
a connecting element comprising a screw locking portion and coupled to the retractable cord via a second connecting element at one end wherein the other end of the connecting element is coupled to a handle of the reach extender via a defined hole in the handle.

9. The mechanical tool of claim 8, wherein the connecting element is circular in shape.

10. The mechanical tool of claim 8, wherein the retractable cord is at least about 29 inches in length.

11. The mechanical tool of claim 8, wherein connecting element comprises a circumference of about 6 inches.

12. The mechanical tool of claim 8, wherein the first end of the lanyard comprises a metal connector.

13. The mechanical tool of claim 12, wherein the first end of the retractable connecting element comprises a clip coupled to the metal connector.

14. The mechanical tool of claim 8, wherein the connecting element is removably connected to the handle of reach extender.

* * * * *